United States Patent [19]
Schubert et al.

[11] Patent Number: 6,109,125
[45] Date of Patent: Aug. 29, 2000

[54] LINEAR DRIVE MECHANISM INCLUDING A SLIP CLUTCH

[75] Inventors: Peter Schubert; Jürgen Völpel, both of Gaggenau, Germany

[73] Assignee: Precitec GmbH, Gaggenau-Bad Rotenfels, Germany

[21] Appl. No.: 09/201,860

[22] Filed: Dec. 1, 1998

Related U.S. Application Data

[63] Continuation-in-part of application No. 08/867,799, Jun. 3, 1997, Pat. No. 5,865,061.

[30] Foreign Application Priority Data

Dec. 5, 1997 [DE] Germany .......................... 197 54 117

[51] Int. Cl.[7] .............................. F16H 19/06; F16D 7/02
[52] U.S. Cl. ............................ 74/89.22; 464/46; 464/30
[58] Field of Search .................................. 74/89.22, 89.2, 74/424.8 R; 384/42; 248/657; 108/143; 464/46, 45

[56] References Cited

U.S. PATENT DOCUMENTS

| | | |
|---|---|---|
| 927,695 | 7/1909 | Stake . |
| 2,839,294 | 6/1958 | McNinch . |
| 3,025,647 | 3/1962 | Moody . |
| 3,709,049 | 1/1973 | Gerauer . |
| 4,366,722 | 1/1983 | Hasler . |
| 4,715,241 | 12/1987 | Lipinski et al. ................... 74/424.8 R |
| 4,739,669 | 4/1988 | Yokose et al. ..................... 74/424.8 R |
| 4,934,203 | 6/1990 | Bailey et al. ...................... 74/424.8 R |
| 4,957,014 | 9/1990 | Burke . |
| 4,998,442 | 3/1991 | Brown . |
| 5,531,557 | 7/1996 | Springer . |

FOREIGN PATENT DOCUMENTS

| | | |
|---|---|---|
| 0 672 844 | 3/1995 | European Pat. Off. . |
| 24 31 881 | 1/1976 | Germany . |
| 196 22 413 | 12/1997 | Germany . |
| 2 088 987 | 6/1982 | United Kingdom . |

OTHER PUBLICATIONS

DE Brochure Bruno Madler, 1978, pp. 12, 13.

*Primary Examiner*—David A. Bucci
*Assistant Examiner*—William C. Joyce
*Attorney, Agent, or Firm*—Laubscher & Laubscher

[57] ABSTRACT

A linear drive mechanism includes a cylindrical hollow housing within which a movable body is mounted for guided collinear movement by drive mechanism including a cable drum that is driven by a drive device having an output shaft, characterized by the provision of a slip clutch between the drive output shaft and the cable drum in order to avoid damage to the drive of the body in the event of a collision between the body and the workpiece in the direction of travel of the body. The drive mechanism may be used for the low-wear and play-free driving of, for example, the connecting head of a laser machining system for material processing.

15 Claims, 3 Drawing Sheets

LINEAR DRIVE MECHANISM INCLUDING A SLIP CLUTCH

CROSS-REFERENCE TO RELATED APPLICATIONS

This application is a continuation-in-part application based on the parent U.S. application Ser. No. 08/867,799 filed by Peter Schubert on Jun. 3, 1997, now U.S. Pat. No. 5,865,061.

BACKGROUND OF THE INVENTION

1. Field of the Invention

This invention relates to a linear drive mechanism operable to convert rotary motion to linear motion, characterized by the provision of a slip clutch arrangement between the rotary drive shaft and the rotatably-driven cable drum means, thereby to protect the mechanism from damage.

2. Brief Description of the Prior Art

In order to convert a rotational movement produced, for example, by an electric motor, a hydraulic motor or a pneumatic motor, into a linear movement, use is normally made of threaded spindles or rack and pinion arrangements as transmission elements. The disadvantage with these types of drive means is the fact that mechanical parts move on one another, which leads to wear phenomena. Furthermore, inaccuracies as a result of production tolerances have to be taken into account in designing the drive means.

It is well known in the patented prior art to utilize flexible cables or bands for connecting a rotary drive member with a linearly displaceable driven member, as shown, for example, by the Hasler U.S. Pat. No. 4,366,722, the Blount British Patent No. 2,088,987, the Kolb German Off. No. 2,431,881, and the Jakob European Application No. 672,844.

In the copending parent application Ser. No. 08/867,799 filed Jun. 3, 1997, in the name of Peter Schubert, linear drive means have been proposed for linearly moving a body, which is guided on a housing, by means of a cable drum, which is rotatably mounted on the housing and around which a cable is wound, the latter being stretched directly between the ends of the body which are opposite in the direction of movement. If the cable drum is rotated in one direction or the other, it takes the cable with it as a result of a frictional connection, which leads to a corresponding displacement of the body to which the ends of the cable are connected. The drive operates virtually without wear, since the cable on the cable drum is only wound up or unwound. As a result of this, production tolerances in the area of the cable or cable drum can no longer have a detrimental effect on the accuracy of the drive.

Since the cable is connected under tension directly between the ends of the body, there are no further drive or deflection elements above and below, the body, which leads to a relatively low overall height. The displacement travel of the body is limited only by the cable drum, which is located at the side, but this does not lead to any further problems in the case of linear drives with a small stroke.

The problem with this embodiment is that, in the event of a collision or impact of the body with, for example, a workpiece to be processed, there is the risk that the drive of the body will be damaged.

The present invention was developed to provide an improved linear drive mechanism of the type described above wherein in all the operating conditions of the linear drive, the drive device of the body is protected against damage.

SUMMARY OF THE INVENTION

Accordingly, a primary object of the present invention is to provide an improved mechanism for converting rotary motion to linear motion, including slip clutch means connected between the output shaft of reduction gear drive means and the driven cable drum, whereby in the event that a collision occurs between the body and a workpiece to be processed in the direction of travel of the body, it is possible for the drive device to continue to rotate, even in the event of jamming of the body, without causing damage in the drive train. Of course, following the collision, the drive device may be stopped, in order to avoid further loading, in particular also to the slip clutch. The slip clutch itself may be designed, for example, as a purely mechanical clutch or as an electromagnetically operating clutch.

According to a further object of the invention, the slip clutch includes spring means supported directly or indirectly on the output shaft and pressing laterally, directly or indirectly, against the cable drum. The spring device may comprise one or more disc springs, which are seated coaxially on the shaft. The force of the spring device may be adjustable, in order to be able to predefine the response behavior of the slip clutch. Adjusting the force of the spring device may be carried out, for example, with the aid of one or more nuts threadably connected on the shaft on which the spring device is supported. In order to prevent damage to the cable drum by the spring device, it is possible for a washer, which is provided as a sliding surface and is likewise seated coaxially on the shaft, to be provided between the two devices. On the side of the washer facing the cable drum, the said washer may bear a friction surface or friction washer. There may also be a friction washer of this type on the other side of the cable drum.

According to a more specific object of the invention, the cable drum contains circumferential grooves for guiding the cable, thereby preventing the turns of the cable from rubbing against each other during the winding and unwinding of the cable on the cable drum.

The cable drum is preferably driven via a reduction gear mechanism in order to be able to perform the most exact and low-power positioning of the body. In this case, in order to drive the cable drum, use may be made of an electric motor, which is mounted on the holder. It may be coupled to the reduction gear mechanism via a belt drive, for example.

According to another object of the invention, the housing and the movable body are of cylindrical design and arranged coaxially with each other. By this means, a relatively compact linear drive is obtained. It may be used, for example, for the linear displacement of the connecting head of a laser machining system. In this case, the connecting head is fastened to the movable body. The connecting head of the laser machining system may contain, for example, optic means for focusing a laser beam passing through it, and it may be connected on the beam outlet side to a nozzle with a distance measuring electrode, and the like. A connecting head of this type is generally well known in the art.

According to a further object of the invention, the body has two annular end rings, which are spaced apart from each other in the direction of movement, which are connected to each other via parallel guide rods, which likewise run in the direction of movement and are guided in cylindrical guides on the holder. By this means, on the one hand, a linear drive with a relatively low weight is obtained, while, on the other hand, it is now possible to stretch the cable simply between the end rings and to arrange the cable drum in the region between the end rings or slightly to the side of these. This likewise leads to improved compactness of the overall linear drive.

According to a further object of the invention, a tensioning device is provided for tensioning the cable. Thus, the tensioning device may comprise a bush, which is firmly connected to one end of the cable and has an internal thread, into which a screw held by the body can be screwed. The tension of the cable may thus be set specifically or reset after a relatively long operating time of the linear drive, so that a predetermined frictional force between cable and cable drum is always ensured.

However, in a modification of the invention, the cable drum may also be provided with a clamping device for clamping the cable thereon. This prevents in a positive manner any slippage of the cable on the cable drum.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
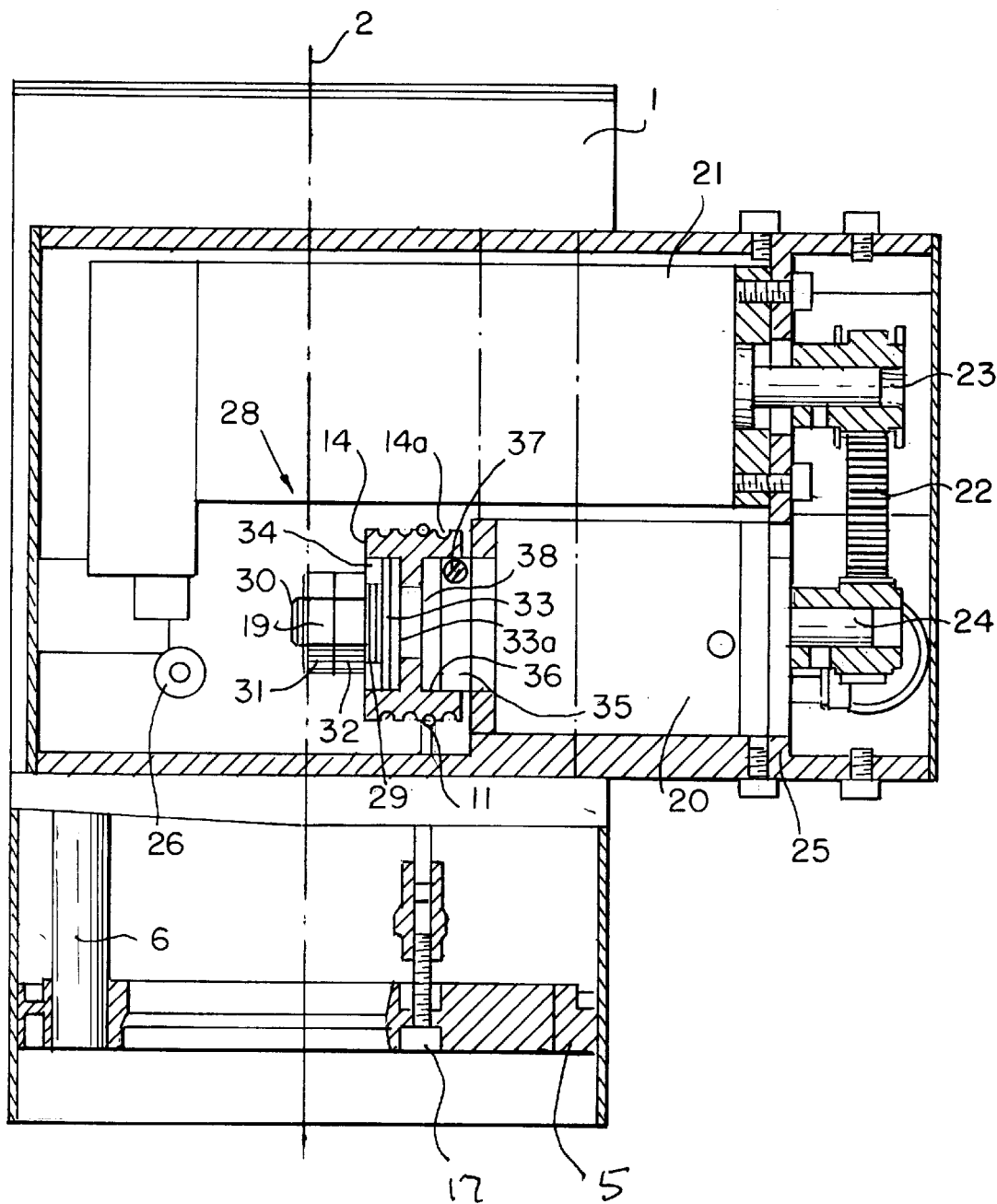
FIG. 1 is a front sectional view of the slip clutch of the present invention taken along line 1—1 of FIG. 2.
Figure 2:
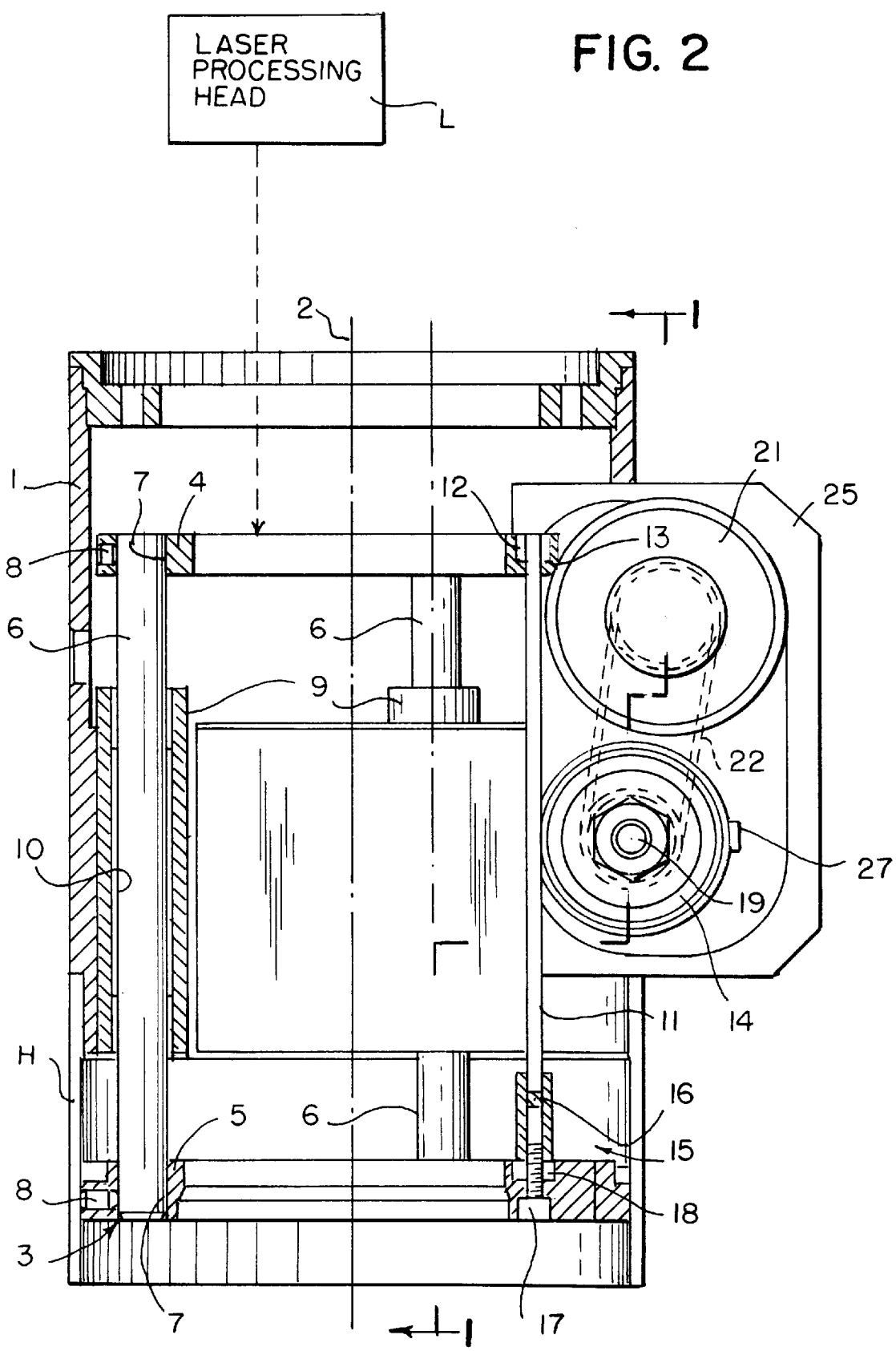
FIG. 2 is a partly sectioned side elevation view of the apparatus of FIG. 1.
Figure 3:
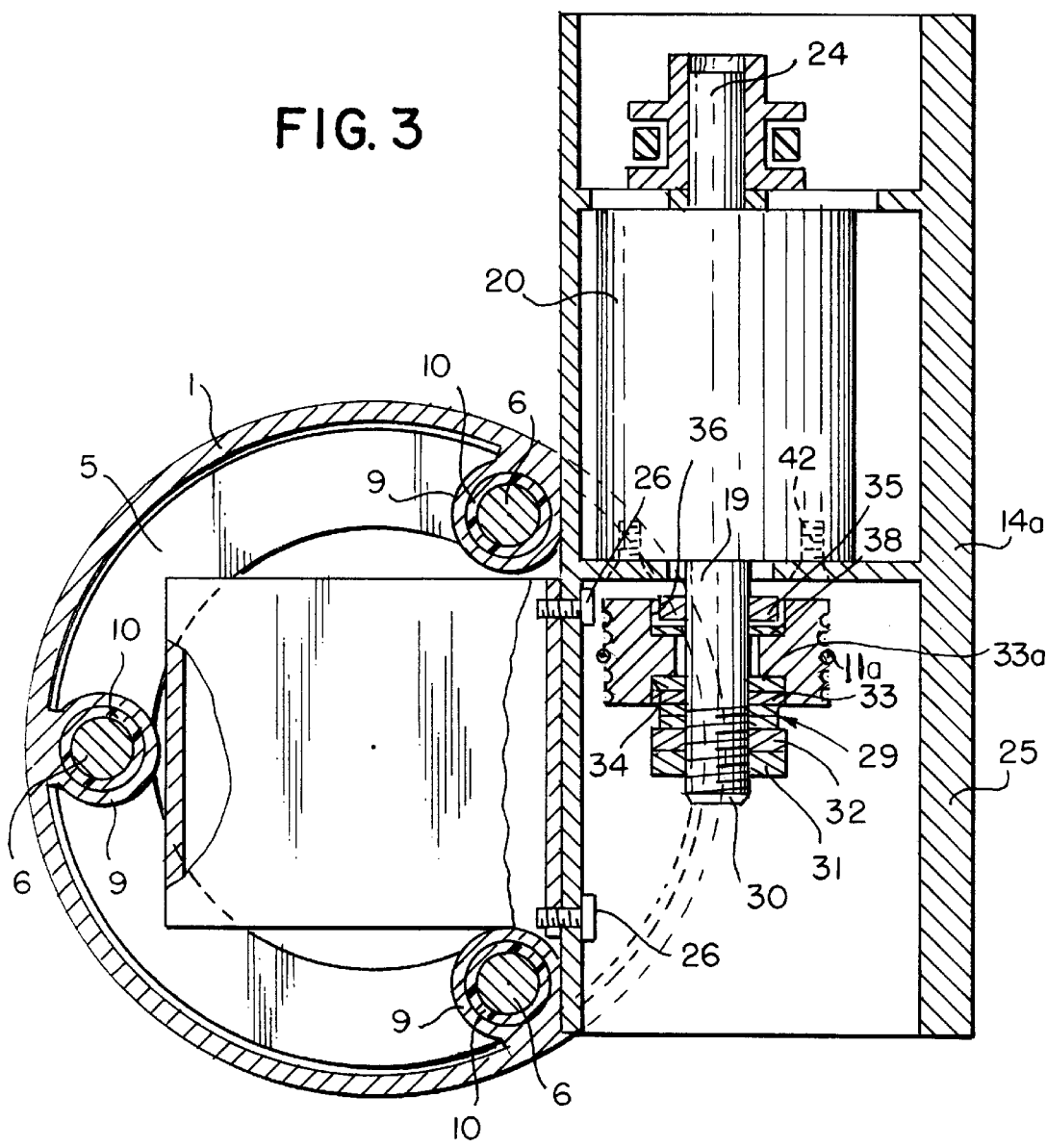
FIG. 3 is a sectional view taken along line 3—3 of FIG. 2.

In accordance with FIGS. 1–3, the linear drive arrangement of the present invention includes a hollow cylindrical or sleeve-like housing 1 having a longitudinal axis 2. Located coaxially with the central axis 2 and within the housing 1 is a movable body 3, which is displaceable in the direction of the central axis 2.

The body 3 has two annular end rings 4 and 5, which are each located in a plane which is normal to the central axis 2. In this case, the end rings 4 and 5 are spaced apart from each other in the direction of the central axis 2. The two end rings 4 and 5 are connected with each other via guide rods 6, which run parallel to the central axis 2. In the present case, three guide rods 6 are arranged at approximately equal angular intervals from each other in the circumferential direction of the end rings 4 and 5. The guide rods 6 project into recesses 7 contained in the respective end rings 4 and 5 and are fastened there with the aid of set screws 8 or threaded pins, which extend through radial circumferential openings in the end rings 4 and 5 and press against the guide rods 6.

The cylindrical guide rods 6 belonging to the movable body 3 are mounted so that they can slide in cylindrical guides 9, which are fastened to the inside of the housing 1. In this case, the cylindrical guides 9 extend in the direction of the central axis 2 only to such an extent that an intended stroke of the body 3 in the direction of the central axis 2 is still possible. The displacement of the body 3 in the housing 1 takes place essentially without play, since in each case a guide rod 6 together with associated guide 9 is able to form a clearance fit, for example. However, it is also possible to provide a cylindrical synthetic plastic sleeve 10 as a sliding guide between guide rod 6 and guide 9.

In order to drive the body 3 within the housing 1, use is made of a cable 11, which may be, for example, a flexible steel cable. In its upper region in FIG. 2, this cable 11 is firmly connected with a cylindrical attachment fitting 12. This cylindrical attachment fitting 12 is seated within a corresponding recess contained in the upper end of the end ring 4, this recess tapering in the direction of the lower end of the end ring 4 to such an extent that only the cable 11 is still able to pass through. In order to be able to insert the cable 11 and the attachment 12 into the recess contained in the end ring 4, the latter may be provided with a radial slot 13, originating from its inner side, whose width corresponds to the diameter of the cable 11. In other words, it is thus possible for the cable 11 with its attachment 20 to be fastened to the end ring 4.

The cable 11 is wound around a cable drum 14, for example, over a wrap angle of 360°, and is fastened by way of its other end to the end ring 5. The cable fastened to the end ring 5 via a tensioning device 15. This tensioning device 15 includes a cylindrical bush 16, which firmly accommodates the cable 11 at its one or top end. At the end facing the end ring 5, the bush 16 has an internal thread, into which a screw 17 is screwed. This screw 17 projects through the end ring 5 and is supported on the latter by its screw head. If it is screwed into the internal thread in the bush 16, it pulls the bush 16 in the direction towards the end ring 5 and, if necessary, into a recess 18 provided in the end ring 5, so that the cable 11 may be tensioned in this way.

The cable drum 14 is mounted laterally between the end rings 4 and 5, specifically on the holder 1. An axle 19 of the cable drum 14 runs normal to the longitudinal direction 2 or tangential to the sleeve-like housing 1. The axle or shaft of the cable drum 14 is the output drive-side shaft of a reduction gear mechanism 20, which is driven on the drive side by an electric motor 21, specifically via a toothed belt 22. A shaft 23 of the electric motor 21 and a drive-side shaft 24 of the reduction gear mechanism 20 in this case lie parallel to each other.

The reduction gear mechanism 20 and the electric motor 21 are mounted in a housing 25 which, for its part, is fastened to the housing 1, for example via screws 26.

In order to prevent the cable 11 from slipping on the cable drum 14, if this is necessary, a clamping screw 27 can be screwed radially into the cable drum 14, in order to fix the cord 11 using the head of the clamping screw 27. This may be expedient in the case of a relatively large mass of a connecting head to be moved in the case of laser machining system L. In the case of smaller masses, the frictional force between cable 11 and cable drum 14 is generally sufficient for play-free positioning.

The lower portion of movable body 3 is protectively covered by the protective sleeve H that is connected with the lower edge of housing 1.

According to a characterizing feature of the invention, a slip clutch 28 is connected between the cable drum 14 and the externally threaded output shaft 19 of the reduction gear means. The slip clutch includes an annular disc spring assembly 29 that is mounted concentrically about the shaft 19 adjacent the lock nut 31 and tensioning nut 32 that are threadably mounted at the free extremity of the shaft 19. Washer 33 and friction washer 33a are mounted concentrically about shaft 19 between the spring assembly 29 and the transverse body portion 14d of cable drum 14. In order to prevent the overall length of the slip clutch from becoming too large, it is possible for washer 33, friction washer 33a and disc spring assembly 29 to be contained within a counterbore 34 formed in the end of the cable drum 14.

The other end of the cable drum 14 contains a counterbore 36 that receives an annular split collar 35 mounted concentrically on output shaft 19, thereby to reduce the length of the slip clutch means. The split collar is frictionally fastened to shaft 19 by tangentially-arranged set screw 37. A further friction washer 38 is arranged between collar 36 and the adjacent transverse wall portion 14*d* of the cable drum 14. Preferably the friction washers 33*a* and 38 are formed of a suitable durable synthetic plastic material.

Figure 4:
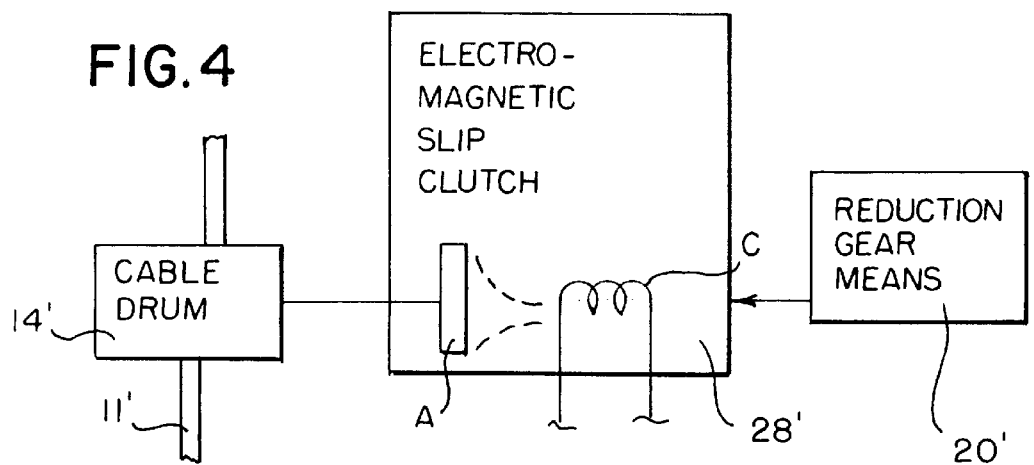
FIG. 4 is a diagrammatic representation of another embodiment of the slip clutch means of FIG. 1.

In the modification of FIG. 4, the slip means comprises an electromagnetic slip clutch 28' having a rotor winding connected with the output shaft of the reduction gear means 20', and an armature connected with the cable drum 14' for operating the cable 11'.

While the preferred forms and embodiments of the present invention have been illustrated and described in accordance with the provisions of the Patent Statutes, it will be apparent that changes may be made without deviating from the inventive concepts set forth above.

What is claimed is:

1. Linear drive apparatus for linearly displacing a driven member relative to a housing, comprising:
    (a) a cylindrical housing (1) containing a longitudinal chamber having a longitidinal axis (2);
    (b) a cylindrical driven member (3) arranged concentrically within said chamber, said driven member including:
        (1) a pair of longitudinally spaced annular end rings (4,5) each contained in a plane extending normal to said longitudinal axis; and
        (2) a plurality of parallel longitudinally-extending guide rods (6) connected between said end rings;
    (c) guide means connecting said driven member for longitudinal displacement within said housing chamber; said guide means including a plurality of fixed parallel guide sleeves (9) connected with said housing and extending within said chamber for slidably receiving said guide rods, respectively and
    (d) drive means for driving said driven member longitudinally relative to said housing, said drive means including:
        (1) a cylindrical cable drum (14) having a peripheral surface containing a circumferential cable guide groove (14*a*);
        (2) means supporting said cable drum for rotation relative to said housing about an axis contained in a plane that is normal to said housing longitudinal axis;
        (3) a flexible cable (11) having an intermediate portion wound about said cable drum and extending within said cable guide groove, and a pair of cable end portions connected with the opposite ends of said driven member, respectively; and
        (4) means (20, 21) for rotatably driving said cable drum, thereby to linearly displace said driven member relative to said housing, said drive means including:
            (a) a drive shaft (19) arranged collinearly relative to said cable drum axis of rotation; and
            (b) slip clutch means (28) connecting said drive shaft with said cable drum.

2. Linear drive apparatus as defined in claim 1, wherein said cable drum contains a longitudinal bore rotatably receiving said drive shaft; and further wherein said slip clutch means comprises a mechanical slip clutch (28).

3. Linear drive apparatus as defined in claim 2, wherein said mechanical slip clutch includes spring means (29) arranged to apply a frictional force against at least one end of said cable drum.

4. Linear drive apparatus as defined in claim 3, wherein said spring means includes at least one annular disk spring arranged concentrically about said drive shaft.

5. Linear drive apparatus as defined in claim 3, and further including means (32) for adjusting the biasing force of said spring means.

6. Linear drive apparatus as defined in claim 5, wherein said output shaft is externally threaded, and further wherein said spring biasing force adjusting means comprises at least one tensioning nut (32) threadably mounted on said drive shaft adjacent said spring means.

7. Linear drive apparatus as defined in claim 6, and further including at least one washer (33) arranged concentrically on said drive shaft between said spring means and said cable drum.

8. Linear drive apparatus as defined in claim 1, and further including reduction gear means (20) having an output shaft that defines said drive shaft.

9. Linear drive apparatus as defined in claim 8, and further including drive motor means (21) connected with said housing for driving said reduction gear means.

10. Linear drive apparatus as defined in claim 1, wherein said housing and said driven member are coaxially arranged for relative longitudinal displacement.

11. Linear drive apparatus as defined in claim 1, wherein said cable drum is mounted between the parallel planes containing said end rings, and further wherein the ends of said cable are connected with said end rings, respectively.

12. Linear drive apparatus as defined in claim 11, and further including means for adjusting the tension of said cable.

13. Linear drive apparatus as defined in claim 12, wherein said cable tension adjusting means includes a pair of threadably connected elements connected between said movable body and said cable, respectively.

14. Linear drive apparatus as defined in claim 13, and further including clamping means (27) for clamping the turns of said cable to said drum.

15. Linear drive apparatus as defined in claim 1, and further including a laser machining system having a connecting head connected with said movable body member.

* * * * *